(12) United States Patent
Lee et al.

(10) Patent No.: US 6,177,973 B1
(45) Date of Patent: Jan. 23, 2001

(54) VERTICAL ALIGNMENT MODE LIQUID CRYSTAL DISPLAY HAVING ENHANCED RESPONSE TIME

(75) Inventors: Seung Hee Lee, Ich'on; In Cheol Park, Seoul; Hyang Yul Kim, Ich'on; Yun Hee Lee, Seoul, all of (KR)

(73) Assignee: Hyundai Electronics Industries Co., Ltd., Kyoungki- do (KR)

( * ) Notice: Under 35 U.S.C. 154(b), the term of this patent shall be extended for 0 days.

(21) Appl. No.: 09/198,829

(22) Filed: Nov. 24, 1998

(30) Foreign Application Priority Data

Dec. 8, 1997 (KR) .................................................. 97-66702

(51) Int. Cl.[7] ........................ G02F 1/1337; G02F 1/1343
(52) U.S. Cl. ......................... 349/123; 349/126; 349/130; 349/141
(58) Field of Search .................................. 349/123, 126, 349/141, 130, 143, 117

(56) References Cited

U.S. PATENT DOCUMENTS

| | | | |
|---|---|---|---|
| 5,113,274 | 5/1992 | Takahashi et al. | 359/66 |
| 5,223,960 | 6/1993 | Kim | 359/54 |
| 5,303,074 | 4/1994 | Salisbury | 359/59 |
| 5,381,252 | 1/1995 | Chen | 359/48 |
| 5,598,285 * | 1/1997 | Kondo et al. | 349/39 |
| 5,621,558 * | 4/1997 | Shimada et al. | 349/130 |
| 5,666,179 | 9/1997 | Koma | 349/143 |
| 5,677,747 * | 10/1997 | Ishikawa et al. | 349/76 |
| 5,745,206 | 4/1998 | Koike et al. | 349/129 |
| 5,748,275 * | 5/1998 | Sato et al. | 349/144 |
| 5,818,558 | 10/1998 | Ogishima | 349/110 |
| 5,946,067 * | 8/1999 | Kim et al. | 349/141 |
| 5,986,735 * | 11/1999 | Komatsu | 349/128 |
| 6,005,650 * | 12/1999 | Kim et al. | 349/130 |

* cited by examiner

Primary Examiner—William L. Sikes
Assistant Examiner—Tarifur R. Chowdhury
(74) Attorney, Agent, or Firm—Ladas & Parry

(57) ABSTRACT

A liquid crystal display(LCD) comprise a first substrate, a first electrode formed on a front surface of the first substrate, a second electrode spaced from the first electrode on the front surface of the first substrate, a first vertical alignment film formed on a surface of a resultant in which the first electrode and the second electrode are formed and rubbed in a length direction of the second electrode, a first polarization film disposed on a back surface of the first substrate opposite to the front surface of the first substrate, a second substrate having a surface opposite to the first substrate, a second vertical alignment film formed on the opposite surface of the second substrate and rubbed in a length direction of the second electrode, a liquid crystal layer interposed between the first vertical alignment film and the second vertical alignment film so that all the liquid crystal molecules in the liquid crystal layer have a single uniform tilt angle with respect to the first substrate when no voltage is applied, and a second polarization film formed on a back surface of the second substrate opposite to the opposite surface of the second substrate.

15 Claims, 2 Drawing Sheets

VERTICAL ALIGNMENT MODE LIQUID CRYSTAL DISPLAY HAVING ENHANCED RESPONSE TIME

BACKGROUND

The present invention relates to a technique of an electrically controlled birefringence(ECB)-in plane switching (IPS) mode liquid crystal display(LCD), and more particularly to the LCD for improving a response speed thereof by treating an alignment film such as the rubbing.

Many study for solving a narrow viewing angle of a twisted Nematic(TN) mode LCD has developed. As one of the researches, a double ECB mode LCD had been produced using a vertical alignment film and a liquid crystal with negative dielectric anisotropy by Fujitsu Co., Ltd in Japan. In the double ECB mode LCD, two domains in which liquid crystal molecules are arranged in a given direction and each domain is symmetrical to each other, thus realizing a wide viewing angle. However, for forming the two domains of the double ECB mode LCD, two-time mask rubbing and optical alignment should be performed, so the manufacturing process for two domains is complicated. In addition, the two-time mask rubbing can result in the destruction of an element underlying the vertical alignment film and further in the difficulty of an application of mass production line for the LCD.

Therefore, the present applicant had been invented a new ECB-IPS mode LCD having a pixel electrode and a counter electrode both formed in a lower substrate and further having a phase compensation film, which was filled in a patent application to Korean Industrial Patent and Trademark Office(KIPO) on May 30, 1997. As shown in FIG. 2A, the liquid crystal molecules over the vertical alignment films formed on the entire surface of the lower substrate on which the pixel electrode and the counter electrode are disposed and the entire surface of a upper substrate, form a given tile angle θ with respect to the both substrates when no voltage is applied. The tilt angle θ is about 85 to about 90 degree, and each liquid crystal molecule has a different tilt angle θ and thus all liquid crystal molecules are randomly arranged at the tilt angle range of about 85 to about 90 degree. Accordingly, a random arrangement of the liquid crystal molecules is made at "on"/"off" of the voltage, and one liquid crystal molecule collide against adjacent liquid crystal molecule after the application of voltage, thus slowing down a response speed of the LCD.

SUMMARY

Accordingly, an aim of a present invention is to increase the response speed of the LCD.

In order to accomplish the aim of the present invention, a liquid crystal display(LCD) comprising: a first substrate; a pixel electrode as a first electrode formed on a front surface of the first substrate; a counter electrode as a second electrode, spaced from the first electrode on the front surface of the first substrate; a first vertical alignment film formed on a surface of a resultant in which the first electrode and the second electrode are formed and rubbed in a length direction of the second electrode; a first polarization film disposed on a back surface of the first substrate opposite to the front surface of the first substrate; a second substrate having a surface opposite to the first substrate; a second vertical alignment film formed on the opposite surface of the second substrate and rubbed in a length direction of the second electrode; a liquid crystal layer interposed between the first vertical alignment film and the second vertical alignment film so that all the liquid crystal molecules in the liquid crystal layer have a single uniform tilt angle with respect to the first substrate when no voltage is applied; and a second polarization film formed on a back surface of the second substrate opposite to the opposite surface of the second substrate.

Here, a rubbing direction of the first vertical alignment film and a rubbing direction of the second vertical alignment film form about 0 to about 30 degree from the length of the second electrode toward a right or left direction. The single uniform tilt angle is about 85 to about 90 degree. The liquid crystal molecule has a positive or negative dielectric anisotropy.

The LCD further has a phase compensation film formed between the counter electrode and the second polarization film for making an index of refraction anisotropy isotropic in order to prevent an optical leakage when no voltage is applied.

The vertical alignment film is rubbed so that all the liquid crystal molecules have a single uniform tilt angle over the vertical alignment film, so the collision between the liquid crystal molecules are prevented between the "on" of the voltage and the "off" of the voltage, thus increasing a response speed of the LCD.

BRIEF DESCRIPTION OF THE ATTACHED DRAWINGS

DESCRIPTION OF THE EMBODIMENT

Figure 1A:
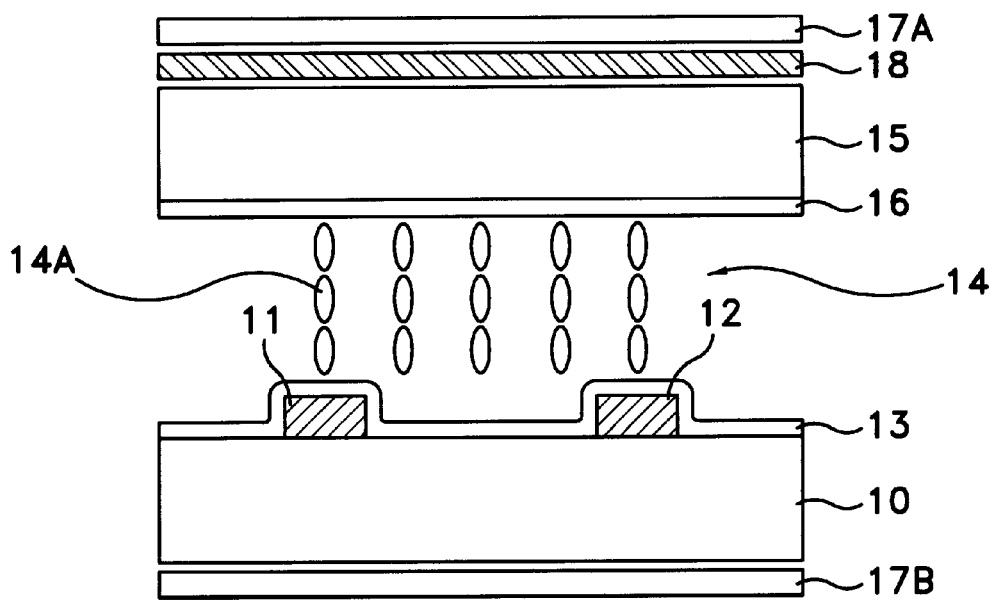
FIGS. 1A and 1B show sectional views of a IPS-LCD according to the present invention.
Figure 1B:
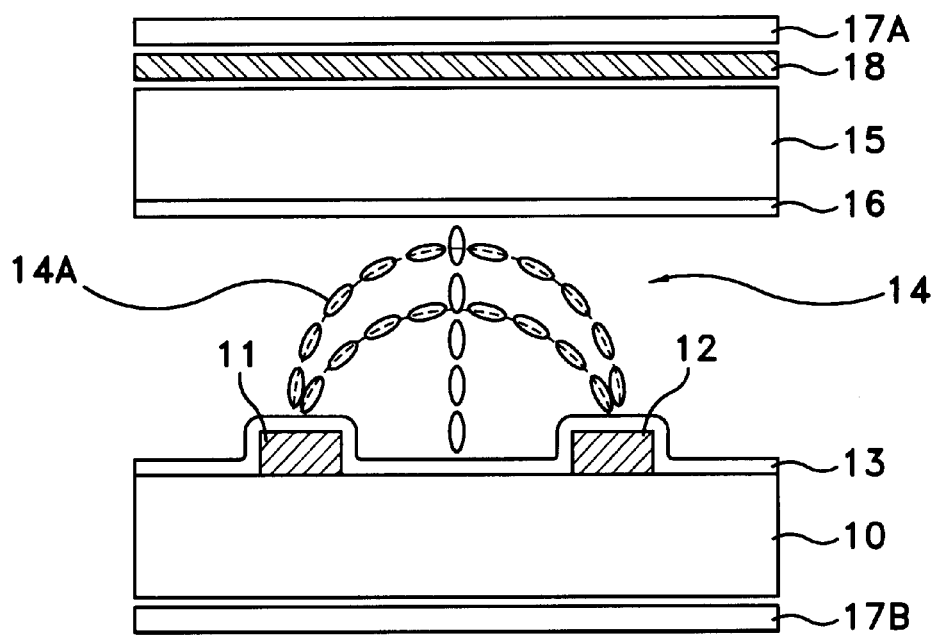

In FIGS. 1A and 1B, on a lower substrate 10 are disposed a pixel electrode 11 and a counter electrode 12 spaced from the pixel electrode 11. The counter electrode 12 is made of opaque metal, for example aluminum or chromium or transparent metal such as Indium Tin Oxide. On the lower substrate 11 are formed a gate line, a data line and a thin film transistor. On a upper substrate 15 opposite to the lower substrate 10 are provided a plurality of color filters(not shown) and a black matrix formed between the color filters (not shown). The liquid crystal layer 14 interposed between the two substrates includes liquid crystal molecules with a positive dielectric anisotropy. The vertical alignment films 13 and 16 for making the arrangement of the liquid crystal vertical in no applied voltage, are formed on the lower substrate 10 having the pixel electrode 11 and the counter electrode 12 and on the upper substrate 15, respectively. The polarization films 17A and 17B for polarizing the incident light are formed crosswise on back surfaces of the upper substrate and the lower substrate.

Accordingly, when no voltage is applied, all the liquid crystal molecules are vertically arranged to the substrates 10 and 15. when the voltage is supplied, the liquid crystal molecules are arranged as shown in FIG. 1B. The liquid crystal molecules directly attached to the both substrates maintain their arrangement because of the force between the liquid crystal molecules and the vertical alignment film. In the symmetrical line of an ellipse electrical field, i.e., middle part of both electrodes, since the horizontal components of torque generated by the electric field from the both electrodes are offset and only vertical components thereof remain, the liquid crystal molecules at the symmetrical line also maintain their initial state. The electric field and the arrangement of the liquid crystal are symmetrical to the symmetrical line. Accordingly, double domains each of which is symmetrical to each other in left and right direction can be realized without an additional mask rubbing or an optical alignment.

In case where a rod-type liquid crystal molecules are used in the above ECB mode LCD, even if no voltage is applied, an optical leakage is generated except an absorption axis of the polarization film or optical axis because of the birefringence of the liquid crystal molecules and the feature of the polarization film. To remove the optical leakage, between the upper substrate 15 and the polarization film 17A is provided a phase compensation film 18. The formation of double domain and the function of phase compensation film 18 were described in Korean Patent Application No. 97-22108 filed by the present applicant.

In the patent application 97-22108, the vertical alignment films are not rubbed. However, in the present application, the vertical alignment 13 formed on the lower substrate 10 having the pixel electrode 11 and the counter electrode 12 is rubbed so that the rubbing angle is about 0 to about 30 degree from a length of the counter electrode toward left or right direction. Using the same method, the vertical alignment film 16 formed on the upper substrate 16 is rubbed. The rubbing direction of the alignment films on the lower substrate and the upper substrate is not parallel. Therefore, when no voltage is applied, the liquid crystal molecule 14A in the liquid crystal layer 14 is arranged not randomly but uniformly with a single tilt angle.

Figure 2A:
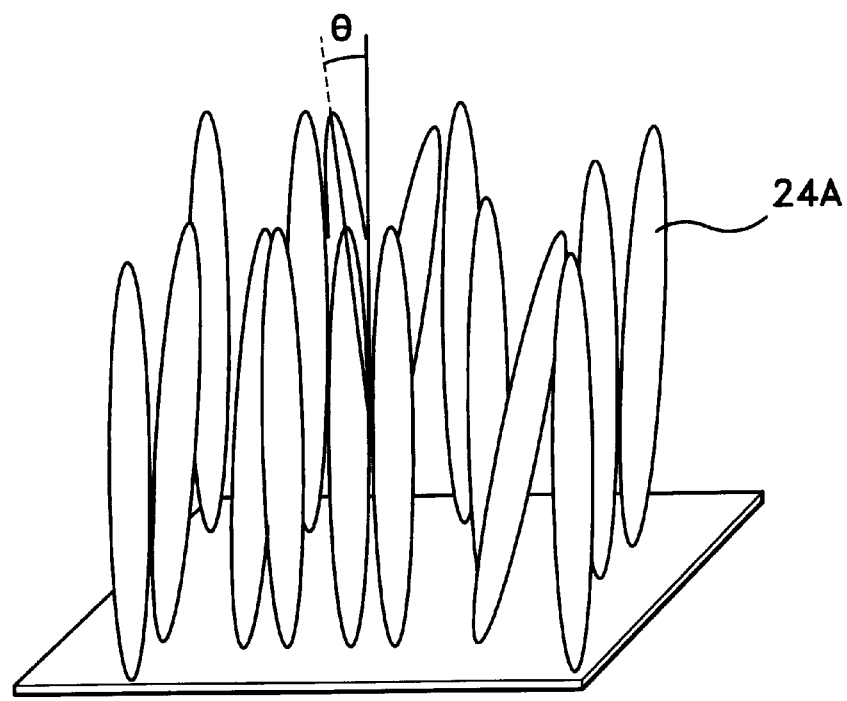
FIGS. 2A and 2B show arrangement of liquid crystal molecules before and after the rubbing of the vertical alignment film according to the present invention, respectively.
Figure 2B:
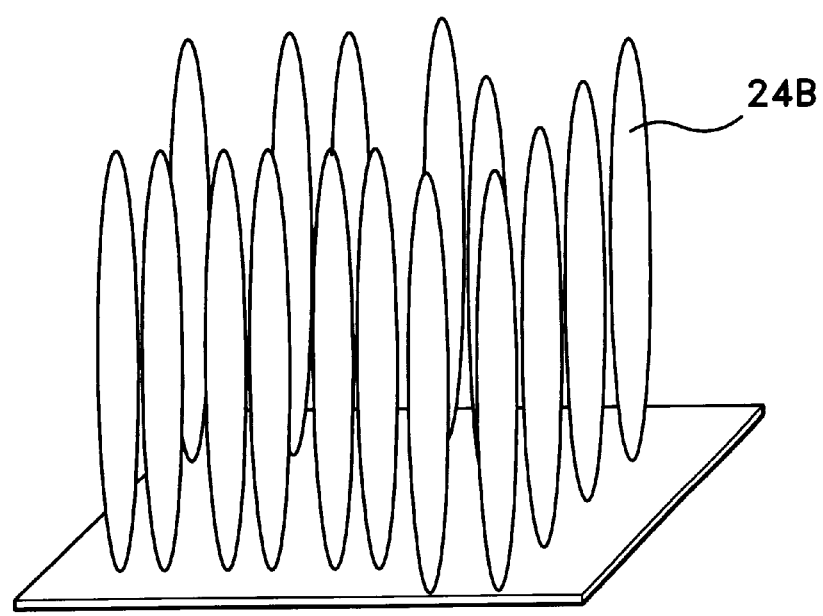

In detail, the liquid crystal molecules in 97-22108 are randomly arranged with the tilt angle θ from the vertical direction of the lower substrate as shown in FIG. 2A. Because of using the vertical alignment film, in ideal state all the liquid crystal molecules are vertically arranged to the lower substrate. However, at coating of the alignment material, a uniformity of the alignment material, process condition or a subsequent process of the LCD manufacturing process affects a bonding between the alignment material and the liquid crystal molecules, so each liquid crystal molecule has a respective tilt angle θ in a given range. Since the voltage is applied under the condition that the tilt angle of each liquid crystal molecule is different, the liquid crystal molecule collides with adjacent liquid crystal molecule during the arrangement of the liquid crystal molecules along the electric field. As a result, the response speed of the LCD is reduced, in comparison with the liquid crystal molecule having one uniform tilt angle. Accordingly, in the present invention, the vertical alignment films 13 and 16 directly attached to the liquid crystal molecules are treated so that the liquid crystal molecules have single uniform tilt angle. The treatment is performed by rubbing with a cloth or by optical alignment. The rubbing and the optical alignment are the same to that used in the conventional art. Further, a slanting deposition, a rotation deposition or an ion beam may be used for treating the vertical alignment films. All the liquid crystal molecules over the vertical alignment films subjected to the treatment have single uniform tilt angle of about 85 to about 90 degree from the lower substrate. In FIG. 2B, the liquid crystal molecules all have 90 degree tilt angle.

Though in the present embodiment only the IPS-LCD having the pixel electrode and the counter electrode both formed on the lower substrate is described, the spirit of the present invention can be applied to a LCD having a pixel electrode and a counter electrode each formed on the lower substrate and the upper substrate, respectively and using the vertical alignment film and a liquid crystal molecule with a positive dielectric anisotropy, thereby forming double domains.

In addition, the spirit of the present invention can be applied to a LCD using the vertical alignment film and a liquid crystal molecule with a negative dielectric anisotropy. When no voltage is applied the liquid crystal molecules are arranged as the same form as the liquid crystal molecules with a positive dielectric anisotropy by the vertical alignment film. That is, the liquid crystal molecules all have one uniform tilt angle. When the voltage is applied, a minor axis of a liquid crystal molecule with a negative dielectric anisotropy is arranged along the electric field, the arrangement being symmetrical to the middle part of the pixel electrode and the counter electrode. Therefore, like the LCD using the liquid crystal molecule with a positive dielectric anisotropy, the collision of the liquid crystal molecules between the "off" of the voltage and the "on" of the voltage is prevented, thus increasing the response speed of the LCD.

In the LCD having the pixel electrode and the counter electrode formed on the lower substrate for forming double domains, the response time after the treatment of the vertical alignment film is 17.366 msec while the response time before the treatment is 25.457 msec. That is, we can easily recognize that the response time of the LCD is drastically increased by the treatment of the vertical alignment film according to the present invention.

What is claimed is:

1. A liquid crystal display (LCD) comprising:
   a first substrate;
   a first electrode formed on a front surface of the first electrode;
   a second electrode spaced from the first electrode on the surface of the first electrode;
   a first vertical alignment film formed on a surface of a resultant in which the first electrode and the second electrode are formed, wherein a rubbing direction of the first vertical alignment film forms about 0 to 30 degree from the length direction of the second electrode toward a right or left direction;
   a first polarization film disposed on a back surface of the first substrate opposite to the front surface of the first substrate;
   a second substrate having a surface opposite to the first substrate;
   a second vertical alignment film formed on the opposite surface of the second substrate, wherein a rubbing direction of the second vertical alignment film forms about 0 to 30 degree from the length direction of the second electrode toward a right or left direction;
   a liquid crystal layer interposed between the first vertical alignment film and the second vertical alignment film, the liquid crystal layer comprising a plurality of liquid crystal molecules, the liquid crystal molecules having a single uniform tilt angle with respect to the first substrate when no voltage is applied; and
   a second polarization film formed on a back surface of the second substrate opposite to the opposite surface of the second substrate, whereby collisions between the liquid crystal molecules during application of a voltage to the LCD are prevented, thus decreasing the response time of the LCD.

2. The LCD according to claim 1, wherein the single uniform tilt angle is about 85 to about 90 degrees.

3. The LCD according to claim 2, wherein the liquid crystal molecules have a positive dielectric anisotropy.

4. The LCD according to claim 3, further comprising a phase compensation film formed between the second electrode and the second polarization film in order to make an isotropy of an index of refraction anisotropy of the liquid crystal molecules.

5. The LCD according to claim 1, wherein the liquid crystal molecule has a positive dielectric anisotropy.

6. The LCD according to claim 5, further comprising a phase compensation film formed between the second electrode and the second polarization film in order to make an isotropy of an index of refraction anisotropy of the liquid crystal molecules.

7. The LCD according to 1, wherein the liquid crystal molecules have a positive dielectric anisotropy.

8. The LCD according to claim 7, further comprising a phase compensation film formed between the second electrode and the second polarization film in order to make an isotropy of an index of refraction anisotropy of the liquid crystal molecules.

9. The LCD according to claim 1, wherein the liquid crystal molecules have a negative dielectric anisotropy.

10. The LCD according to claim 1, wherein the rubbing of the first electrode and the second electrode is performed by using a rubbing-cloth.

11. The LCD according to claim 1, wherein the first electrode is a pixel electrode and the second electrode is a counter electrode.

12. The LCD according to claim 1, wherein the first electrode and the second electrode are made of opaque metal.

13. The LCD according to claim 12, wherein the opaque metal is aluminum or chromium.

14. The LCD according to claim 1, wherein the first electrode and the second electrode are made of transparent metal.

15. The LCD according to claim 14, wherein the transparent metal is Indium Tin Oxide.

* * * * *